C. F. KETTERING & W. A. CHRYST.
ELECTRIC MACHINE.
APPLICATION FILED MAY 29, 1916.

1,284,365.

Patented Nov. 12, 1918.

Witnesses    Inventors
Charles F. Kettering
William A. Chryst
By Kerr, Page, Cooper and Hayward
Attorneys.

UNITED STATES PATENT OFFICE.

CHARLES F. KETTERING AND WILLIAM A. CHRYST, OF DAYTON, OHIO, ASSIGNORS TO THE DAYTON ENGINEERING LABORATORIES COMPANY, A CORPORATION OF OHIO.

ELECTRIC MACHINE.

1,284,365.

Specification of Letters Patent.   Patented Nov. 12, 1918.

Original application filed March 7, 1913, Serial No. 752,733. Divided and this application filed May 29, 1916. Serial No. 100,610.

*To all whom it may concern:*

Be it known that we, CHARLES F. KETTERING and WILLIAM A. CHRYST, citizens of the United States of America, residing at Dayton, county of Montgomery, and State of Ohio, have invented certain new and useful Improvements in Electric Machines, of which the following is a full, clear, and exact description.

This invention relates to an improvement in electrical machines, and more particularly to that type of electrical machine which is adapted to be combined with electrical systems, preferably used on motor vehicles.

The present application is a divisional application of our co-pending application, Serial No. 752,733, filed March 7, 1913, for improvements in electric machines, patented June 12, 1917, Patent No. 1,229,754.

The objects and advantages of the present invention will be clearly apparent from the following description, with reference to the accompanying drawings, wherein a preferred form of embodiment of the present invention is clearly illustrated.

Figures 1, 2, 3:
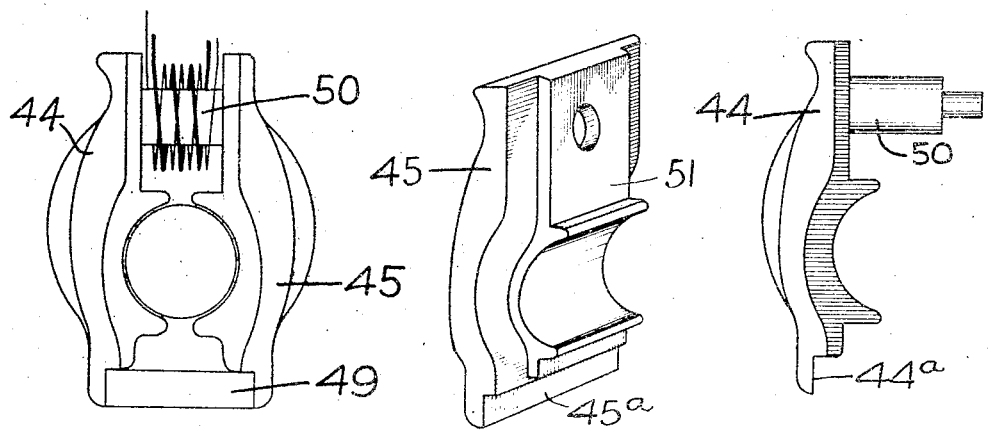
Figure 1 is a view, partly diagrammatic and partly structural of an electric machine embodying the present invention.
Figs. 2 and 3 are detailed views of the side frame of the electric machine disassembled.

Referring to the drawings it may be stated that the present invention includes an electric machine so constructed and arranged that it may be readily installed on motor vehicles which have relatively small transverse space within which to mount the electric machine.

Figures 4, 5:
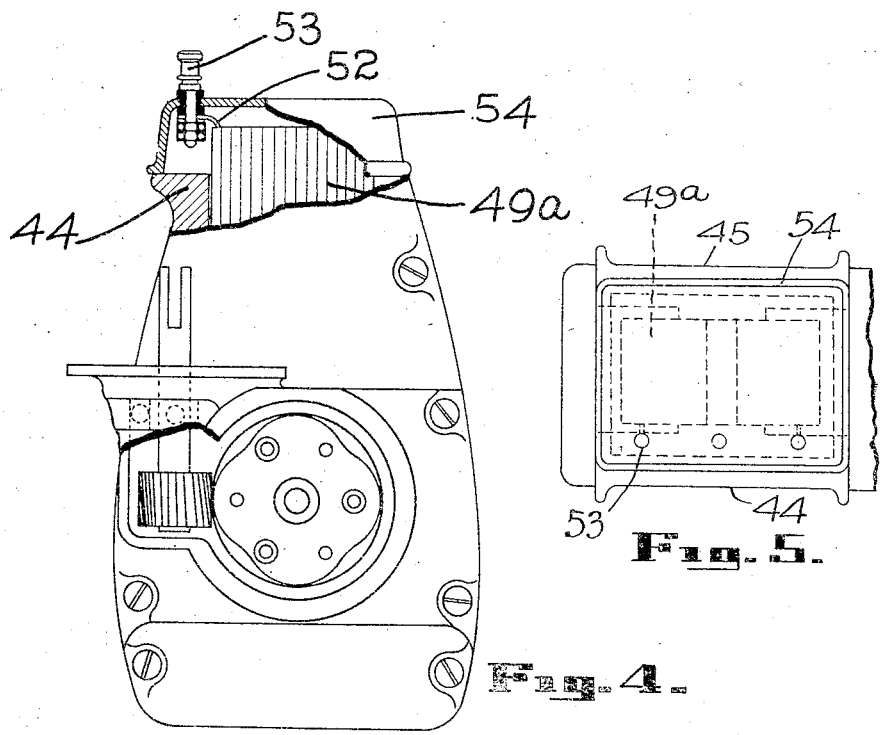
Fig. 4 is a view in end elevation of one form of the electric machine embodied in the present invention, with parts of said machine being shown as broken away to illustrate part of the interior of said machine.
Fig. 5 is a fragmentary top view of the electric machine.

By referring to Figs. 2, 3 and 4, it will be seen that the dynamo-electric-machine is of peculiar and novel construction and consists of two oppositely disposed side frames 44 and 45, which are connected at one end by an element 50, formed of magnetic material, while the opposite ends of said frames are mounted upon and secured to a mass of non-magnetic material 49, which forms a base or support for the other elements of said machine. The element 49 is constructed to abut against the finished surfaces 44ª and 45ª formed upon the lower ends of side frames 44 and 45, and said element 49 coöperates with element 50 to properly space the pole pieces and to rigidly maintain the side frames in proper relation.

Because of the difficulties which the present invention tends to overcome, it is advisable to conform the machine, so that while the elements comprising the frame thereof, will possess a sufficient mass of magnetic material to create a magnetic field of desired strength, the transverse dimensions of the machine are reduced substantially to a minimum.

However, in order to economize in space and also to reduce the weight of the machine to a minimum, but at the same time construct a machine which will possess a sufficient mass of magnetic material to furnish a field of desired strength, the side frames are provided with a central portion, taken on a vertical plane through said frame provided the machine is located as is shown in Fig. 1, of greater thickness than the portions of said frame adjacent to the extreme sides thereof.

Thus it will be seen that that portion of the frames which comprise the pole pieces of the machine, and through which the greatest magnetic flow will occur, is increased in mass over that portion of the frame which constitutes simply an inclosure for the machine.

From the above, it will be seen that the side frames of the dynamo-electric-machine embody the pole pieces of the machine. This not only causes a reduction in the weight of the entire machine, but also greatly facilitates the construction of the same from a manufacturing standpoint, inasmuch as it is possible to cast or forge the side frames and pole pieces of the machine integral and thus avoid the usual multiplicity of machine and assembling operations.

By having the elements, which connect the upper extremities of the side frames together, also form the supporting means for the field windings which are assembled in a single unit 49ª, it is possible to greatly reduce the number of elements which make up the machine and this greatly facilitates the manufacturing and assembling of the machine.

Certain of the terminals 52 of the field windings are connected to binding posts 53, carried by the cover 54, (see Fig. 4). In the above mentioned figure, there is only a single terminal and a single binding post shown. In order to facilitate the coupling up of the terminals of the coil and the binding posts carried by the cover, one of the side frames 44 is flared outwardly at its upper end and forms a supporting surface for the cover 54. It will be noted that the supporting surface of the side frame 44 coöperates with the cover 54 to form an inclosure for the connection of the terminals with the electric connections carried by the cover.

While the form of mechanism herein shown and described, constitutes a preferred form of embodiment of the invention it is to be understood that other forms might be adopted all coming within the scope of the claim which follows.

What we claim is as follows:

In a device of the character described, an electric machine having oppositely disposed side frames; an element connecting said frames; a coil mounted on said connecting element, said coil having a plurality of terminals; a cover for said electric machine; a plurality of electrical connections carried by said cover; one of said side frames being flared outwardly at one end, the upper surfaces of the flared-out end and the cover coöperating to form an inclosure for the connection of the terminals with the electrical connections carried by the cover.

In testimony whereof we affix our signatures in the presence of two subscribing witnesses.

CHARLES F. KETTERING.
WILLIAM A. CHRYST.

Witnesses:
J. W. McDONALD,
O. D. MOWRY.